United States Patent
Singh et al.

(10) Patent No.: US 12,546,472 B2
(45) Date of Patent: Feb. 10, 2026

(54) DOME-DEFLECTOR JOINT COOLING ARRANGEMENT

(71) Applicant: General Electric Company, Schenectady, NY (US)

(72) Inventors: Saket Singh, Bengaluru (IN); Ravindra Shankar Ganiger, Bengaluru (IN); Hiranya Nath, Bengaluru (IN); Perumallu Vukanti, Bengaluru (IN); Ajoy Patra, Bengaluru (IN); Karthikeyan Sampath, Bengaluru (IN); Pradeep Naik, Bengaluru (IN); Rimple Rangrej, Bengaluru (IN); Veera Venkata Amarnath Manem, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 21 days.

(21) Appl. No.: 18/529,428

(22) Filed: Dec. 5, 2023

(65) Prior Publication Data
US 2024/0102653 A1     Mar. 28, 2024

Related U.S. Application Data

(62) Division of application No. 17/810,678, filed on Jul. 5, 2022, now Pat. No. 11,846,419.

(30) Foreign Application Priority Data

Mar. 8, 2022 (IN) .............................. 202211012551

(51) Int. Cl.
*F23R 3/00* (2006.01)
*F23R 3/60* (2006.01)

(52) U.S. Cl.
CPC ................ *F23R 3/002* (2013.01); *F23R 3/60* (2013.01); *F23R 2900/00017* (2013.01);
(Continued)

(58) Field of Classification Search
CPC .. F23R 3/002; F23R 3/60; F23R 2900/00017; F23R 2900/03041; F23R 2900/03042; F23R 2900/03043
See application file for complete search history.

(56) References Cited

U.S. PATENT DOCUMENTS 4,749,298 A    6/1988   Bundt et al.
4,820,097 A    4/1989   Maeda et al.
(Continued)

FOREIGN PATENT DOCUMENTS

| | | |
|---|---|---|
| CN | 108386869 A | 8/2018 |
| EP | 3601748 A1 | 2/2020 |
| KR | 101529816 B1 | 6/2015 |

*Primary Examiner* — Devon C Kramer
*Assistant Examiner* — Henry Ng
(74) *Attorney, Agent, or Firm* — Venable LLP; Edward A. Kmett; Michele V. Frank (57) ABSTRACT

A dome-deflector assembly for a gas turbine includes a dome, a deflector, and at least one dome-deflector connecting assembly that includes a connecting member connecting the dome and the deflector together with a cavity being defined between the dome and the deflector. The connecting member extends through the deflector and has a first end arranged at a hot surface side of the deflector and a second end arranged to connect with the dome. The dome-deflector connecting assembly is configured to provide a flow of cooling air from the cavity to the hot surface side of the deflector to cool the first end of the connecting member on the hot surface side of the deflector.

18 Claims, 7 Drawing Sheets

(52) U.S. Cl.
CPC .............. *F23R 2900/03041* (2013.01); *F23R 2900/03042* (2013.01); *F23R 2900/03043* (2013.01)

(56) References Cited

U.S. PATENT DOCUMENTS

| | | | |
|---|---|---|---|
| 5,956,955 | A | 9/1999 | Schmid |
| 6,941,758 | B2 | 9/2005 | Tiemann |
| 9,518,737 | B2 * | 12/2016 | Pidcock .................. F23R 3/60 |
| 10,422,532 | B2 | 9/2019 | Sadil et al. |
| 10,533,745 | B2 | 1/2020 | Cunha et al. |
| 10,533,747 | B2 | 1/2020 | Corsmeier et al. |
| 10,619,857 | B2 * | 4/2020 | Lemoine ................ F23R 3/002 |
| 10,670,273 | B2 | 6/2020 | Propheter-Hinckley et al. |
| 11,097,835 | B2 | 8/2021 | Goldring et al. |
| 11,561,007 | B2 * | 1/2023 | Ichihashi ............... F23R 3/002 |
| 2003/0000217 | A1 | 1/2003 | North et al. |
| 2008/0092547 | A1 * | 4/2008 | Lockyer .................. F23R 3/04 60/757 |
| 2013/0042627 | A1 | 2/2013 | Gerendas et al. |
| 2014/0102106 | A1 | 4/2014 | Snyder et al. |
| 2015/0260400 | A1 | 9/2015 | Clemen |
| 2016/0146465 | A1 * | 5/2016 | Cunha .................... F23R 3/002 60/751 |
| 2016/0169522 | A1 * | 6/2016 | Cunha .................... F23R 3/283 60/740 |
| 2016/0298841 | A1 | 10/2016 | Papple |
| 2016/0298846 | A1 | 10/2016 | Papple |
| 2017/0009986 | A1 | 1/2017 | Patel et al. |
| 2017/0067642 | A1 | 3/2017 | Szarvasy |
| 2017/0191664 | A1 * | 7/2017 | Bennett .................. F23R 3/10 |
| 2020/0033003 | A1 | 1/2020 | Gerendas |
| 2020/0063963 | A1 | 2/2020 | Bilse et al. |
| 2021/0055000 | A1 | 2/2021 | Ichihashi et al. |
| 2023/0250962 | A1 * | 8/2023 | Musaefendic ............ F23R 3/10 60/722 |

* cited by examiner

DOME-DEFLECTOR JOINT COOLING ARRANGEMENT

CROSS REFERENCE TO RELATED APPLICATIONS

This application is a divisional of U.S. patent application Ser. No. 17/810,678 filed on Jul. 5, 2022, which claims priority to Indian Patent Application No. 202211012551, filed on Mar. 8, 2022, the entire contents of which are hereby incorporated by reference in their entireties.

TECHNICAL FIELD

The present disclosure generally relates to a dome-deflector connection in a combustor in a gas turbine.

BACKGROUND

Some gas turbine engines include a combustor that has a dome with a deflector connected to the dome. The deflector may be connected to the dome by being bolted to the dome by a bolt. The head of the bolt may typically be arranged on a combustion chamber side of the deflector. As a result, the bolted joints, and, more particularly, the bolt head is exposed to intense heat from combustion within the combustor.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some gas turbine engines include a combustor that has a dome with a deflector connected to the dome. The deflector may be connected to the dome by a bolt. The head of the bolt may typically be arranged on a combustion chamber side of the deflector. As a result, the bolted joints, and, more particularly, the bolt head, is exposed to intense heat from combustion within the combustor. Over time, the intense heat has a tendency to deteriorate the structural integrity of the bolt head, requiring replacement of the bolt.

The present disclosure provides a technique for connecting the dome and the deflector so as to provide a cooling airflow to the bolt head. More particularly, in the present disclosure, various arrangements provide for cooling air that flows into a cavity between the dome and the deflector to be directed toward the bolt head on the combustion chamber side of the deflector so as to provide cooling to the bolt head. By providing cooling to the bolt head, the life of the bolt can be increased, thereby reducing the need for replacement.

Figure 1:
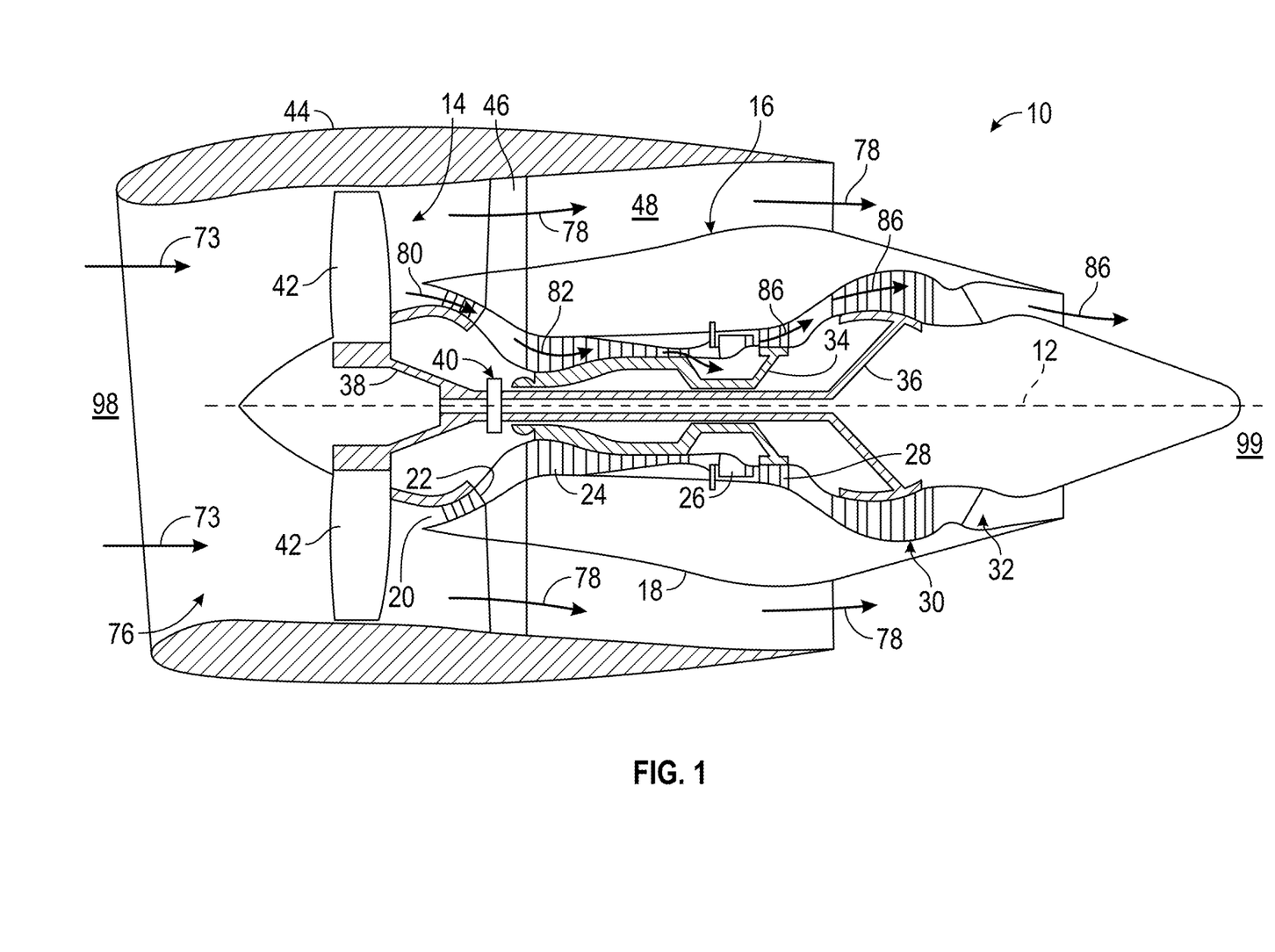
FIG. 1 is a schematic partial cross-sectional side view of an exemplary high by-pass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. As shown in FIG. 1, the engine 10 has an axial centerline axis 12 that extends therethrough from an upstream end 98 to a downstream end 99 for reference purposes. In general, the engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, a compressor section (22/24) having a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
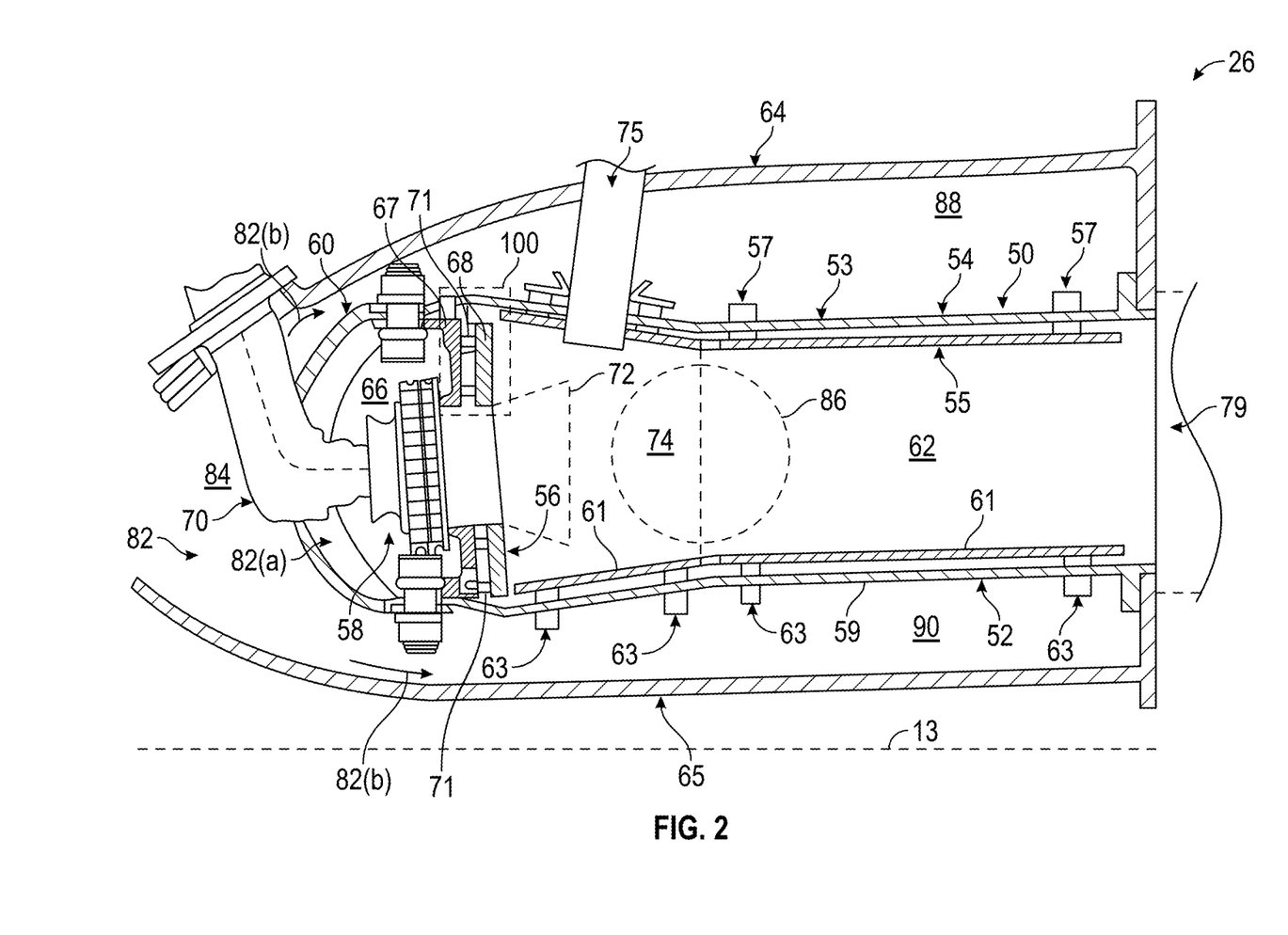
FIG. 2 is a partial cross-sectional side view of an exemplary combustor, according to an aspect of the present disclosure.

FIG. 2 is a cross-sectional side view of an exemplary combustor 26 of the core engine 16 as shown in FIG. 1. As shown in FIG. 2, the combustor 26 may generally include a combustor liner 50 having an inner liner 52 and an outer liner 54, and a dome assembly 56, together defining a combustion chamber 62. The inner liner 52, the outer liner 54, and the dome assembly 56 may extend circumferentially about a combustor centerline axis 13, which may correspond to the engine axial centerline axis 12. The inner liner 52 and the outer liner 54 are connected to a cowl 60, and a pressure plenum 66 is defined between the cowl 60, the inner liner 52, the outer liner 54, and the dome assembly 56. The combustor 26 also includes a mixer assembly 58 that is connected to a fuel nozzle assembly 70. While FIG. 2 depicts a single mixer assembly 58 and a single fuel nozzle assembly 70, a plurality of mixer assemblies 58 and respective fuel nozzle assemblies 70 may be included in the combustor 26, where each respective mixer assembly 58 and fuel nozzle assembly 70 are circumferentially spaced about the combustor centerline axis 13.

As shown in FIG. 2, the inner liner 52 is encased within an inner casing 65 and the outer liner 54 is encased within an outer casing 64. An outer flow passage 88 is defined between the outer liner 54 and the outer casing 64, and an inner flow passage 90 is defined between inner liner 52 and the inner casing 65. Both the outer casing 64 and the inner casing 65 may extend circumferentially about the combustor centerline axis 13. The inner liner 52 and the outer liner 54 may extend from the dome assembly 56 to a turbine nozzle 79 at an entry to the HP turbine 28 (FIG. 1), thus, at least partially defining a hot gas path between the combustor liner 50 and the HP turbine 28. The combustion chamber 62 may more specifically define a primary combustion zone 74 at which an initial chemical reaction of a fuel-oxidizer mixture 72 occurs to generate combustion gases 86, and/or where recirculation of the combustion gases 86 may occur before the combustion gases 86 flow further downstream within the combustion chamber 62 and into the turbine nozzle 79 at the entry to the HP turbine 28 and the LP turbine 30. The outer liner 54 may be a multi-layer liner that includes an outer liner shell 53 and outer liner panels 55 that are connected to the outer liner shell 53 via a plurality of outer liner shell-to-panel connecting members 57. Similarly, the inner liner 52 may be a multi-layer liner that includes an inner liner shell 59 and inner liner panels 61 that are connected to the inner liner shell 59 via a plurality of inner liner shell-to-panel connecting members 63. In addition, as will be described in more detail below, the dome assembly 56 may include a dome 67 and a deflector 68 connected to the dome 67 via a plurality of dome-to-deflector connecting members 71. While FIG. 2 depicts two dome-to-deflector connecting members 71, the plurality of dome-to-deflector connecting members 71 may include more than two dome-to-deflector connecting members 71, and the plurality of dome-to-deflector connecting members 71 may be circumferentially spaced apart from one another about the combustor centerline axis 13 to connect the dome 67 and the deflector 68 together to form the dome assembly 56.

During operation of the engine 10, as shown in FIGS. 1 and 2 collectively, a volume of air, as indicated schematically by arrows 73, enters the engine 10 from the upstream end 98 through an associated nacelle inlet 76 of the nacelle 44 and/or the fan assembly 14. As the air 73 passes across the fan blades 42, a portion of the air 73 is directed or routed into the bypass airflow passage 48 as a bypass airflow 78, while another portion of the air 73 is directed or routed into the LP compressor 22 as a compressor inlet air 80. The compressor inlet air 80 is progressively compressed as it flows through the LP compressor 22 and the HP compressor 24 towards the combustor 26. As shown in FIG. 2, compressed air 82 flows into and pressurizes a diffuser cavity 84. A first portion of the compressed air 82, as indicated schematically by arrows 82($a$), flows from the diffuser cavity 84 into the pressure plenum 66, where it is mixed by mixer assembly 58 with fuel provided by the fuel nozzle assembly 70. The fuel-oxidizer mixture 72 is then ejected into the combustion chamber 62 by the mixer assembly 58. The fuel-oxidizer mixture 72 is ignited by an ignitor 75 and burned to generate the combustion gases 86 within the primary combustion zone 74 of the combustion chamber 62. Typically, the LP compressor 22 and the HP compressor 24 provide more compressed air 82 to the diffuser cavity 84 than is needed for combustion. Therefore, a second portion of the compressed air 82, as indicated schematically by arrows 82($b$), may be used for various purposes other than combustion. For example, as shown in FIG. 2, compressed air 82($b$) may be routed into the outer flow passage 88, and another portion of the compressed air 82($b$) may be routed into the inner flow passage 90. In addition, or in the alternative, at least a portion of the compressed air 82($b$) may be routed out of the diffuser cavity 84 for other purposes, such as to provide cooling air to at least one of the HP turbine 28 or the LP turbine 30.

Referring back to FIGS. 1 and 2 collectively, the combustion gases 86 generated in the combustion chamber 62 flow through the turbine nozzle 79 and into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at the downstream end 99.

Figure 3:
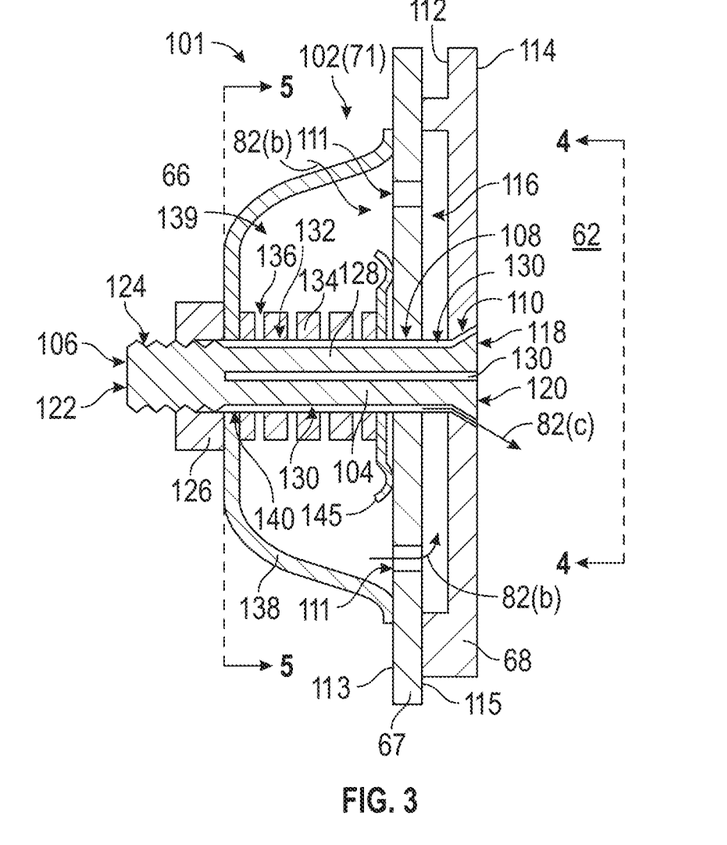
FIG. 3 is a schematic partial cross-sectional view of a dome-deflector connecting assembly taken at detail view 100 of FIG. 2, according to an aspect of the present disclosure.

FIG. 3 is a schematic partial cross-sectional view of a dome-deflector assembly 101 taken at detail view 100 of FIG. 2, according to an aspect of the present disclosure. The dome 67 and the deflector 68 are connected together to form the dome assembly 56 (FIG. 2) by a plurality of dome-deflector connecting assemblies 102 (one shown in FIG. 3), which may correspond to the plurality of the dome-to-deflector connecting members 71 (FIG. 2). In FIG. 3, the dome-deflector connecting assembly 102 includes a connecting member 104, which in FIG. 3 is in the form of a bolt 106. The dome 67 and the deflector 68 are connected to each other so as to define a cavity 116 between the dome 67 and the deflector 68. The dome 67 includes a dome-side connecting member openings 108, and may include a plurality of dome cooling passages 111 that extend through the dome 67 from an upstream side 113 of the dome 67 to a cavity side 115 of the dome 67. The dome cooling passages 111 provide a flow of the compressed air 82 (*b*) to flow from the pressure plenum 66 on the upstream side 113 of the dome 67 into the cavity 116. The deflector 68 includes a deflector-side connecting member opening 110 that extends therethrough from a cold surface side 112 of the deflector 68 to a hot surface side 114 of the deflector 68. The bolt 106 (connecting member 104) includes a first end 118 that defines a bolt head 120 and a second end 122 that defines a threaded shank portion 124. The bolt head 120 engages with the hot surface side 114 of the deflector, and, as shown in FIG. 3, the deflector-side connecting member opening 110 may be countersunk at the hot surface side 114 to allow the bolt head 120 to be flush with the hot surface side 114 of the deflector 68. The bolt 106 (connecting member 104) extends through the deflector-side connecting member opening 110 and through the dome-side connecting member opening 108. The threaded shank portion 124 may threadedly engage with a retention member 126, such as a nut.

Figure 4:
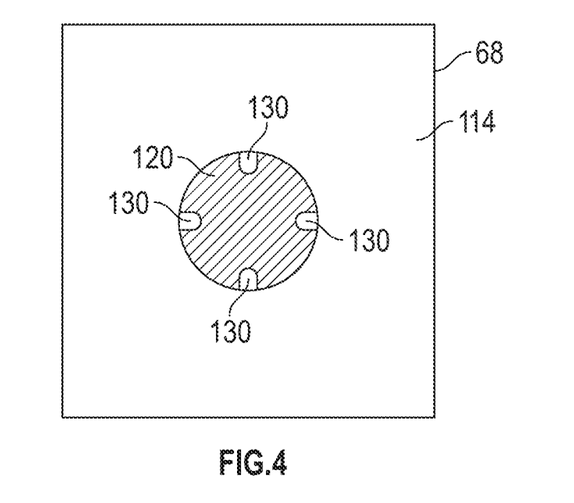
FIG. 4 depicts an example of a bolt head and cooling passages therethrough taken at view 4-4 of FIG. 3, according to an aspect of the present disclosure.

The dome-deflector connecting assembly 102 is configured to provide a flow of cooling air from the upstream side 113 of the dome 67 adjacent to the pressure plenum 66 and from the cavity 116 to the hot surface side 114 of the deflector 68 to cool the first end 118 of the connecting member 104 on the hot surface side 114 of the deflector 68. In the aspect of FIG. 3, the bolt 106 includes a shank 128 that extends between the first end 118 and the second end 122. A plurality of longitudinal slotted cooling passages 130 are arranged through an outer surface 132 of the bolt 106 and extend along at least a portion of the shank 128 and through the bolt head 120. FIG. 4, which is taken at view 4-4 of FIG. 3, depicts a view of the longitudinal slotted cooling passages 130 extending through the bolt head 120 at the hot surface side 114 of the deflector 68. Thus, the plurality of longitudinal slotted cooling passages 130 provide for a flow of air 82(*c*) to flow from the upstream side 113 of the dome 67 and from the cavity 116 to the hot surface side 114 of the deflector 68 and provide cooling to the bolt head 120.

Referring still to FIG. 3, the dome-deflector connecting assembly 102 may further include a sleeve 134 that engages with the shank 128 of the bolt 106 on the upstream side 113 of the dome 67. To provide the flow of cooling air 82(*c*) to pass to the longitudinal slotted cooling passages 130, the sleeve 134 may include a plurality of sleeve cooling passages 136 that provide fluid communication to the plurality of longitudinal slotted cooling passages 130 of the bolt 106. The sleeve cooling passages 136 may generally be arranged orthogonal to the slotted cooling passages 130, or they may be angled to define a generally helical-type arrangement such that the sleeve 134 is arranged as a spring-like sleeve.

Figure 5:
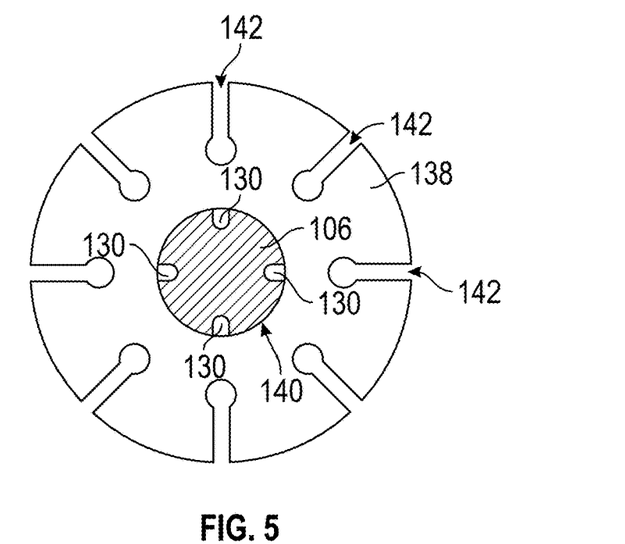
FIG. 5 is a cross-sectional view taken at plane 5-5 of FIG. 3, according to an aspect of the present disclosure.

The dome-deflector connecting assembly 102 of the FIG. 3 aspect may further include a bell-shaped sleeve 138. The bell-shaped sleeve 138 engages with the upstream side 113 of the dome 67 and defines a sleeve-dome cavity 139 between the bell-shaped sleeve 138 and the dome 67. Referring to FIG. 5, which is a cross-sectional view taken at plane 5-5 of FIG. 3, the bell-shaped sleeve 138 is seen to include a sleeve opening 140 therethrough, and the bolt 106 extends through the sleeve opening 140. In addition, the bell-shaped sleeve 138 may include a plurality of cooling passages 142 therethrough. The cooling passages 142 may allow the compressed air 82(*b*) from the pressure plenum 66 to flow therethrough into the sleeve-dome cavity 139 so that the air 82(*c*) can be provided to the plurality of longitudinal slotted cooling passages 130 of the bolt 106. In addition, the compressed air 82(*b*) can be provided from the sleeve-dome cavity 139 through the dome cooling passages 111 to the cavity 116 and then to the longitudinal slotted cooling passages 130 of the bolt 106. The FIG. 3 aspect may further include a spring washer 145 arranged between the upstream side 113 of the dome 67 and the sleeve 134.

Figure 6:
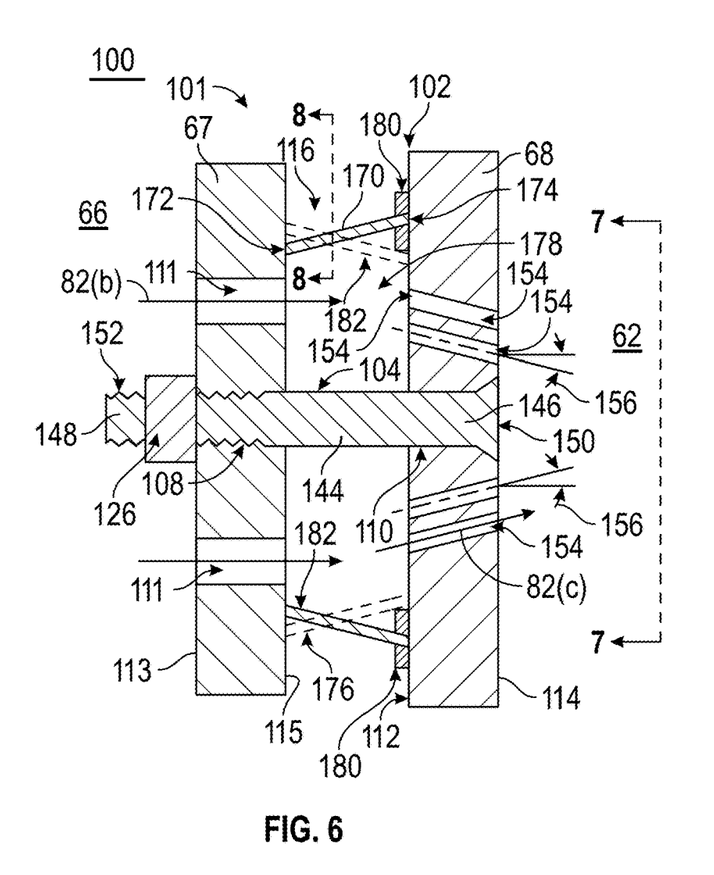
FIG. 6 is a schematic partial cross-sectional view of a dome-deflector assembly taken at detail view 100 of FIG. 2, according to another aspect of the present disclosure.

FIG. 6 is a schematic partial cross-sectional view of a dome-deflector assembly 101 taken at detail view 100 of FIG. 2, according to another aspect of the present disclosure. In the FIG. 6 aspect, the dome-deflector connecting assembly 102 includes a bolt 144 as the connecting member 104, where a first end 146 of the bolt 144 includes a bolt head 150 similar to the bolt head 120 of the FIG. 3 aspect. The bolt 144 also includes a second end 148 that is similar to the second end 122 of the bolt 106 in the FIG. 3 aspect, and includes a threaded shank portion 152 that threadedly engages with a retention member 126 in the form of a nut. Also, similar to the FIG. 3 aspect, the dome 67 includes the dome-side connecting member opening 108, and the deflector 68 includes the deflector-side connecting member opening 110. The dome 67 also includes the plurality of dome cooling passages 111 extending therethrough.

In the FIG. 6 aspect, the deflector 68 includes a plurality of deflector cooling passages 154 extending therethrough and arranged adjacent to the deflector-side connecting member opening 110 so as to provide a flow of the air 82(*c*) from the cavity 116 to cool the bolt head 150. In one aspect, the deflector cooling passages 154 may be arranged at an angle 156 so as to direct the flow of the air 82(*c*) toward the bolt head 150. The angle 156 may have range from, for example, forty five degrees to seventy degrees, although the angle 156 is not limited to the foregoing range and other angles may be implemented instead.

Figure 7A:
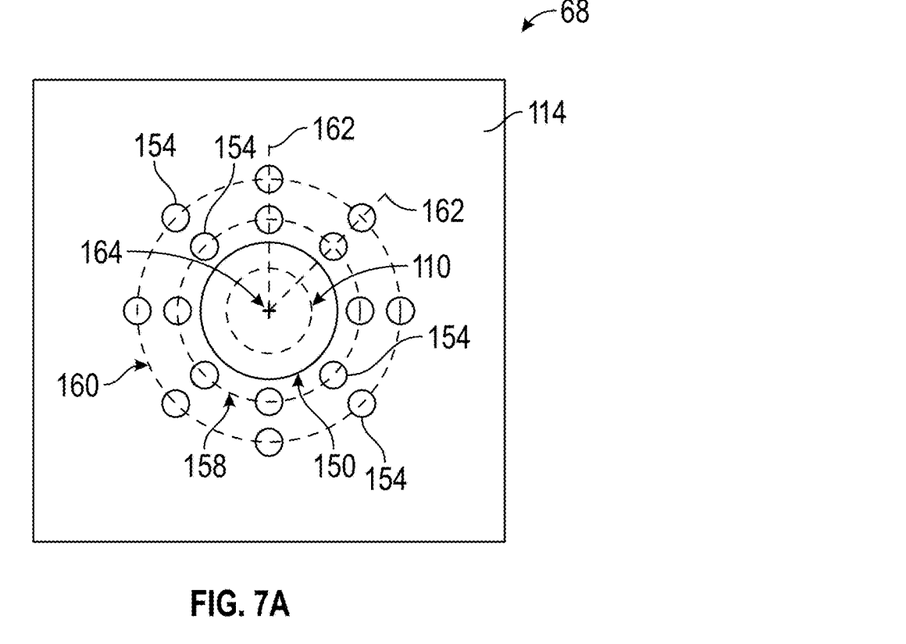
FIG. 7A depicts an arrangement of deflector cooling passages about a deflector-side connecting member opening, taken at view 7-7 of FIG. 6, according to an aspect of the present disclosure.
Figure 7B:
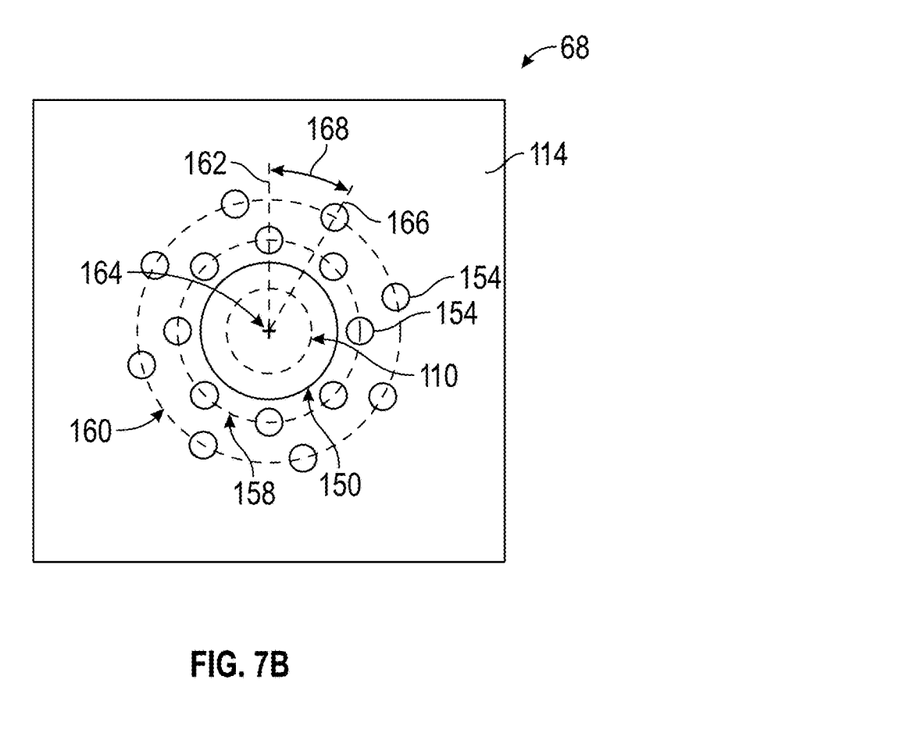
FIG. 7B depicts an arrangement of deflector cooling passages about a deflector-side connecting member opening, taken at view 7-7 of FIG. 6, according to another aspect of the present disclosure.

FIGS. 7A and 7B depict arrangements of the deflector cooling passages 154 about the deflector-side connecting member opening 110. Both FIG. 7A and FIG. 7B are taken at view 7-7 in FIG. 6. In FIG. 7A, the plurality of deflector cooling passages 154 may be seen to be arranged in a plurality of circumferential rows about the deflector-side connecting member opening 110, including a first circumferential row 158 and a second circumferential row 160. In FIG. 7A, the plurality of deflector cooling passages 154 in the first circumferential row 158 are seen to be radially aligned with respective ones of the plurality of deflector cooling passages 154 in the second circumferential row 160 along a radial line 162 extending outward from a centerline axis 164 of the deflector-side connecting member opening 110. In the FIG. 7B aspect, the plurality of deflector cooling passages 154 in the first circumferential row 158 may be circumferentially offset from respective ones of the deflector cooling passages 154 in the second circumferential row 160. For example, the deflector cooling passages 154 of the first circumferential row 158 may be aligned along the radial line 162, while the deflector cooling passages 154 in the second circumferential row 160 may be aligned along a radial line 166 that has an offset angle 168 from the radial line 162.

Referring back to FIG. 6, the dome-deflector connecting assembly includes a hollow conical frustum sleeve 170 arranged within the cavity 116 and surrounding the bolt 144 (connecting member 104) so as to define a sleeve cavity 178 therewithin. The dome cooling passages 111 provide a flow of the compressed air 82(*b*) from the pressure plenum 66 into the sleeve cavity 178. In the aspect of FIG. 6, a minor diameter end 172 of the hollow conical frustum sleeve 170 engages with the cavity side 115 of the dome 67, and a major diameter end 174 engages with the cold surface side 112 of the deflector 68. In an alternate arrangement, a converging hollow conical frustum sleeve 176 may be implemented such that the minor diameter end 172 engages with the cold surface side 112 of the deflector 68, and the major diameter end 174 engages with the cavity side 115 of the dome 67. The converging hollow conical frustum sleeve 176 can provide for a converging flow of the compressed air 82(*b*) through sleeve cavity 178 so as to increase the pressure of the flow exiting the deflector cooling passages 154.

To retain the positioning of the hollow conical frustum sleeve 170 between the dome 67 and the deflector 68, the deflector 68 may include a plurality of sleeve support members 180 extending from the cold surface side 112 of the deflector 68. The sleeve support members 180 may be formed integral with the deflector 68. As an alternative retention method, the hollow conical frustum sleeve 170 may be formed integral with the dome 67 or formed integral with the deflector 68, or may be bonded to the dome 67 or bonded to the deflector 68 by, for example, being brazed.

Figure 8:
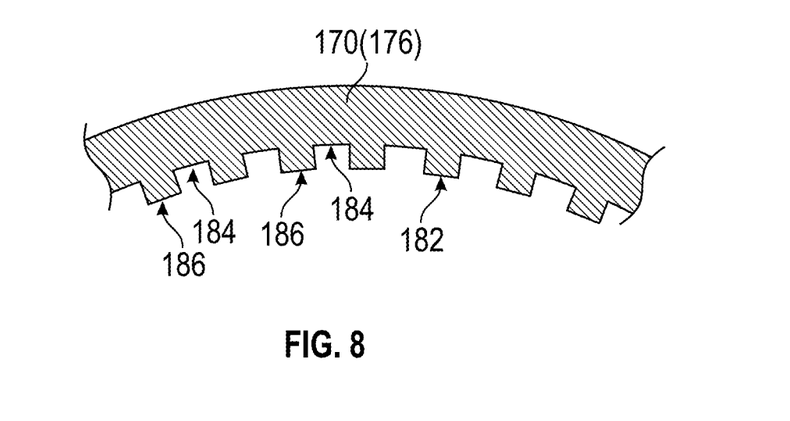
FIG. 8 is a partial cross-sectional view through a portion of a hollow conical frustum sleeve, taken at plane 8-8 of FIG. 6, according to an aspect of the present disclosure.

FIG. 8 is a partial cross-sectional view through a portion of the hollow conical frustum sleeve 170 or through the converging hollow conical frustum sleeve 176, taken at plane 8-8 of FIG. 6. As seen in FIG. 8, an inner surface 182 of the hollow conical frustum sleeve 170 may include a plurality of grooves 184 and/or a plurality of ribs 186. The plurality of grooves 184 and/or the plurality of ribs 186 may extend about the entire circumference of the inner surface of the hollow conical frustum sleeve 170. The plurality of grooves 184 and/or the plurality of ribs 186 may also extend along an entirety of the length of the inner surface 182 from the minor diameter end 172 to the major diameter end 174, or may extend only partially along the length of the inner surface 182 between the minor diameter end 172 and the major diameter end 174.

Figure 9:
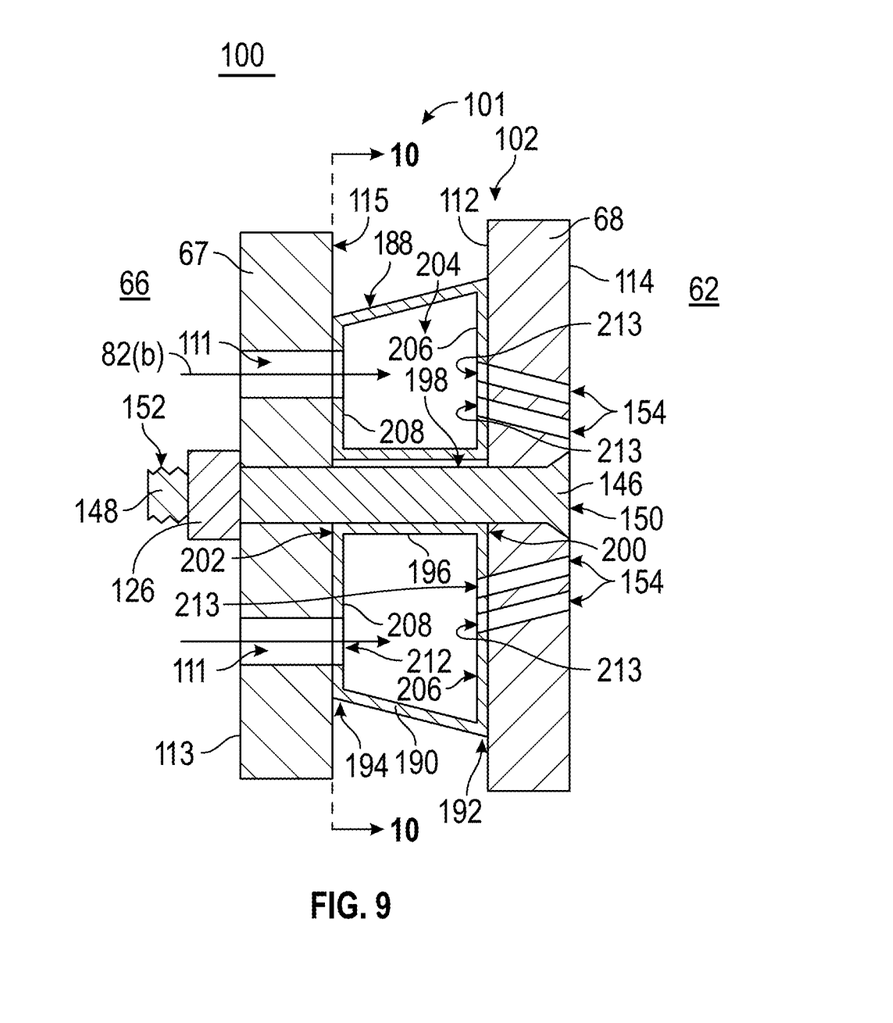
FIG. 9 is a schematic partial cross-sectional view of a dome-deflector assembly taken at detail view 100 of FIG. 2, according to yet another aspect of the present disclosure.

FIG. 9 is a schematic partial cross-sectional view of a dome-deflector assembly 101 taken at detail view 100 of FIG. 2, according to yet another aspect of the present disclosure. The FIG. 9 aspect is similar to the FIG. 6 aspect, but includes a hollow conical frustum sleeve 188 that is different from the hollow conical frustum sleeve 170 and the converging hollow conical frustum sleeve 176. In FIG. 9, the hollow conical frustum sleeve 188 includes a frustum-shaped conical outer wall 190 having a major diameter end 192 and a minor diameter end 194, and a cylindrical-shaped inner wall 196 having a connecting member opening 198 extending from a first end 200 of the cylindrical-shaped inner wall 196 to a second end 202 of the cylindrical-shaped inner wall 196. A sleeve cavity 204 is defined between the cylindrical-shaped inner wall 196 and the frustum-shaped conical outer wall 190. At least one base connecting member 206 connects the major diameter end 192 of the frustum-shaped conical outer wall 190 and the first end 200 of the cylindrical-shaped inner wall 196, and at least one top connecting member 208 connects the minor diameter end 194 of the frustum-shaped conical outer wall 190 and the second end 202 of the cylindrical-shaped inner wall 196.

Figure 10:
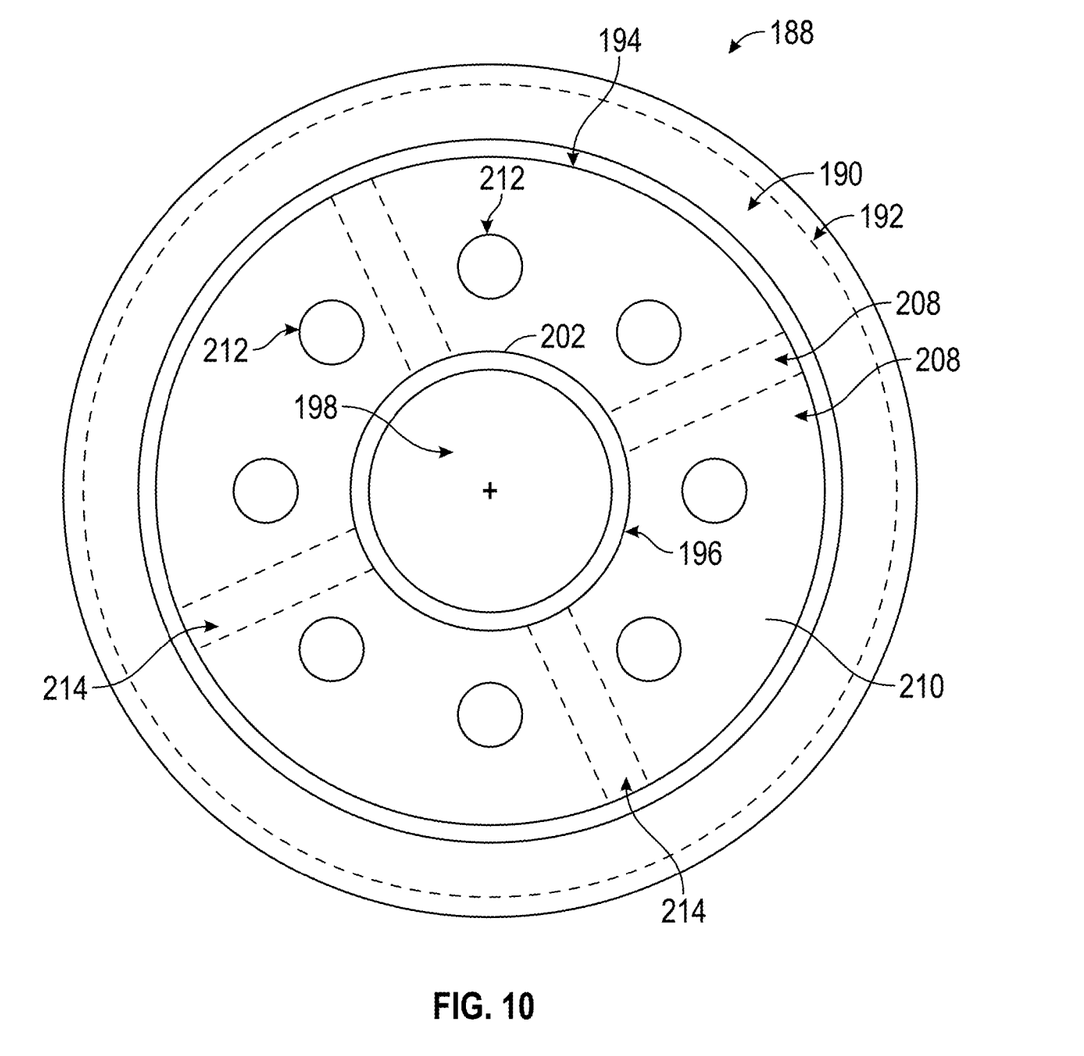
FIG. 10 is a top view of a hollow conical frustum sleeve taken at view 10-10 of FIG. 9, according to an aspect of the present disclosure.

FIG. 10 is a top view of the hollow conical frustum sleeve 188 taken at view 10-10 of FIG. 9. In FIG. 10, the top connecting member 208 may be a circular plate 210 that is connected to the minor diameter end 194 of the frustum-shaped conical outer wall 190 and is also connected to the second end 202 of the cylindrical-shaped inner wall 196. To provide the flow of compressed air 82(*b*) into the sleeve cavity 204, the circular plate 210 may include a plurality of airflow openings 212 therethrough that are arranged in a pattern to align with the dome cooling passages 111 through the dome 67. Alternatively, rather than including the circular plate 210 with the airflow openings 212, a plurality of spoke-type connectors 214 may be implemented to connect the minor diameter end 194 of the frustum-shaped conical outer wall 190 and the second end 202 of the cylindrical-shaped inner wall 196. The at least one base member 206 (FIG. 9) may include a similar arrangement as that of the circular plate 210 with airflow openings 213 therethrough, or may include a plurality of spoke-type connectors (not shown) similar to the spoke-type connectors 214, to connect the major diameter end 192 of the frustum-shaped conical outer wall 190 and the first end 200 of the cylindrical-shaped inner wall 196.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A dome assembly for a gas turbine, the dome assembly including, a dome having a dome-side connecting member opening, a deflector having a cold surface side and a hot surface side, and having a deflector-side connecting member opening therethrough extending from the cold surface side to the hot surface side, and at least one dome-deflector connecting assembly including a connecting member connecting the dome and the deflector together with a cavity being defined between the dome and the deflector, the connecting member extending through the deflector-side connecting member opening and including a first end arranged at the hot surface side of the deflector and a second end arranged to connect with the dome at the dome-side connecting member opening, wherein the dome-deflector connecting assembly is configured to provide a flow of cooling air from the cavity to the hot surface side of the deflector to cool the first end of the connecting member on the hot surface side of the deflector.

The dome-deflector assembly according to the preceding clause, wherein the connecting member comprises a bolt having a shank and a bolt head, the bolt head comprising the first end of the connecting member, the bolt having a plurality of longitudinal slotted cooling passages arranged at an outer surface of the bolt and extending along at least a portion of the shank and through the bolt head.

The dome-deflector assembly according to any preceding clause, wherein the dome-deflector connecting assembly includes a sleeve engaged with the shank of the bolt, the sleeve including a plurality of sleeve cooling passages therethrough that provide fluid communication to the plurality of longitudinal slotted cooling passages of the bolt.

The dome-deflector assembly according to any preceding clause, wherein the dome-deflector connecting assembly further includes a bell-shaped sleeve engaging the dome, the bell-shaped sleeve including a plurality of cooling passages therethrough.

The dome-deflector assembly according to any preceding clause, wherein the dome-deflector connecting assembly further includes a spring washer arranged between the dome and the sleeve.

The dome-deflector assembly according to any preceding clause, wherein the bolt further extends through the dome-side connecting member opening, and a retention member is connected to the shank to connect the dome and the deflector.

The dome-deflector assembly according to any preceding clause, wherein the deflector includes a plurality of deflector cooling passages therethrough arranged adjacent to the deflector-side connecting member opening.

The dome-deflector assembly according to any preceding clause, wherein the dome-deflector connecting assembly includes a hollow conical frustum sleeve arranged within the cavity and surrounding the connecting member.

The dome-deflector assembly according to any preceding clause, wherein the dome includes a plurality of dome cooling passages therethrough, the plurality of dome cooling passages being arranged to provide a flow of cooling air through the dome and into a sleeve cavity within the hollow conical frustum sleeve.

The dome-deflector assembly according to any preceding clause, wherein the plurality of deflector cooling passages are arranged at an angle to direct the flow of cooling air from the sleeve cavity toward a centerline axis of the deflector-side connecting member opening.

The dome-deflector assembly according to any preceding clause, wherein a minor diameter end of the hollow conical frustum sleeve engages with the dome and a major diameter end of the hollow conical frustum sleeve engages with the cold surface side of the deflector.

The dome-deflector assembly according to any preceding clause, wherein the hollow conical frustum sleeve is formed integral with the dome.

The dome-deflector assembly according to any preceding clause, wherein the deflector includes at least one sleeve support member arranged on the cold surface side of the deflector, the at least one sleeve support member engaging with the hollow conical frustum sleeve.

The dome-deflector assembly according to any preceding clause, wherein the connecting member further extends through the dome-side connecting member opening, and a retention member is connected to the second end of the connecting member.

The dome-deflector assembly according to any preceding clause, wherein a major diameter end of the hollow conical frustum sleeve engages with the dome and a minor diameter end of the hollow conical frustum sleeve engages with the cold surface side of the deflector.

The dome-deflector assembly according to any preceding clause, wherein the hollow conical frustum sleeve includes a plurality of ribs and/or a plurality of grooves extending along an inner surface of the hollow conical frustum sleeve between the minor diameter end and the major diameter end.

The dome-deflector assembly according to any preceding clause, wherein the dome-deflector connecting assembly includes a hollow conical frustum sleeve comprising (a) a frustum-shaped conical outer wall having a major diameter end and a minor diameter end, (b) a cylindrical-shaped inner wall having a connecting member opening extending from a first end of the cylindrical-shaped inner wall to a second end of the cylindrical-shaped inner wall, a sleeve cavity being defined between the cylindrical-shaped inner wall and the frustum-shaped conical outer wall, (c) at least one base connecting member connecting the major diameter end of the frustum-shaped conical outer wall and the first end of the cylindrical-shaped inner wall, and (d) at least one top connecting member connecting the minor diameter end of the frustum-shaped conical outer wall and the second end of the cylindrical-shaped inner wall.

The dome-deflector assembly according to any preceding clause, wherein the dome includes a plurality of dome cooling passages therethrough, the plurality of dome cooling passages being arranged to provide a flow of cooling air therethrough into the sleeve cavity.

The dome-deflector assembly according to any preceding clause, wherein the plurality of deflector cooling passages are arranged at an angle to direct the flow of cooling air from the sleeve cavity toward a centerline axis of the deflector-side connecting member opening.

The dome-deflector assembly according to any preceding clause, wherein the connecting member further extends through the dome-side connecting member opening, and a retention member is connected to the second end of the connecting member.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A dome-deflector assembly for a gas turbine, the dome-deflector assembly comprising:
   a dome having a first side surface and a second side surface opposite the first side surface, a plurality of dome-side connecting member openings, and a plurality of dome cooling passages extending therethrough from the first side surface to the second side surface and arranged adjacent to respective ones of the plurality of dome-side connecting member openings;
   a deflector having a cold surface side and a hot surface side, and having a plurality of deflector-side connecting member openings therethrough extending from the cold surface side to the hot surface side, and the deflector includes a plurality of deflector cooling passages therethrough arranged adjacent to respective ones of the plurality of deflector-side connecting member openings; and
   a plurality of dome-deflector connecting assemblies connecting the dome and the deflector together with a cavity being defined between the second side surface of the dome and the cold surface side of the deflector, each one of the plurality of the dome-deflector connecting assemblies being arranged at a respective dome-side connecting member opening and at a respective deflector-side connecting member opening, each dome-deflector connecting assembly including (i) a connecting member, and (ii) a hollow conical frustum sleeve arranged within the cavity and surrounding the connecting member, the hollow conical frustum sleeve having a first end being a major diameter end of the hollow conical frustum sleeve that engages against the second side surface of the dome and a second end being a minor diameter end of the hollow conical frustum sleeve that engages against the cold side surface of the deflector, the connecting member extending through the respective deflector-side connecting member opening, extending through the hollow conical frustum sleeve, and extending through the respective dome-side connecting member opening, and the connecting member including a first end arranged at the hot surface side of the deflector and a second end arranged to connect with the dome at the respective dome-side connecting member opening to connect the dome and the deflector together, wherein, at respective ones of the plurality of dome-deflector connecting assemblies, the plurality of dome cooling passages are arranged to provide a flow of cooling air through the dome and into a sleeve cavity defined within the hollow conical frustum sleeve, and the dome-deflector connecting assembly is configured to provide a flow of cooling air from the sleeve cavity to the hot surface side of the deflector to cool the first end of the connecting member on the hot surface side of the deflector.

2. The dome-deflector assembly according to claim 1, wherein the plurality of deflector cooling passages are arranged at an angle to direct the flow of cooling air from the sleeve cavity toward a centerline axis of the respective ones of the plurality of deflector-side connecting member openings.

3. The dome-deflector assembly according to claim 1, wherein the hollow conical frustum sleeve is formed integral with the dome.

4. The dome-deflector assembly according to claim 1, wherein the deflector includes at least one sleeve support member arranged on the cold surface side of the deflector, the at least one sleeve support member engaging with the hollow conical frustum sleeve.

5. The dome-deflector assembly according to claim 1, wherein the deflector includes a plurality of sleeve support members extending from the cold surface side of the deflector, the plurality of sleeve support members engaging with the hollow conical frustum sleeve to retain a position of the hollow conical frustum sleeve between the dome and the deflector.

6. The dome-deflector assembly according to claim 1, wherein a retention member is connected to the second end of the connecting member.

7. The dome-deflector assembly according to claim 6, wherein the connecting member comprises a bolt having a bolt head on a first end of the bolt, and a threaded shank portion on a second end of the bolt, the bolt head engaging with the respective deflector-side connecting member opening and the second end of the bolt extending through the respective dome-side connecting member opening, and the retention member comprises a nut engaged with the threaded shank portion.

8. The dome-deflector assembly according to claim 1, wherein the hollow conical frustum sleeve includes a plurality of ribs and/or a plurality of grooves extending along an inner surface of the hollow conical frustum sleeve between the minor diameter end and the major diameter end.

9. The dome-deflector assembly according to claim 1, wherein the hollow conical frustum sleeve comprises (a) a frustum-shaped conical outer wall having a major diameter end as the first end of the hollow conical frustum sleeve and a minor diameter end as the second end of the hollow conical frustum sleeve, (b) a cylindrical-shaped inner wall having a connecting member opening extending from a first end of the cylindrical-shaped inner wall to a second end of the cylindrical-shaped inner wall, the sleeve cavity being defined between the cylindrical-shaped inner wall and the frustum-shaped conical outer wall, (c) at least one base connecting member connecting the major diameter end of the frustum-shaped conical outer wall and the first end of the cylindrical-shaped inner wall, and (d) at least one top connecting member connecting the minor diameter end of the frustum-shaped conical outer wall and the second end of the cylindrical-shaped inner wall.

10. The dome-deflector assembly according to claim 9, wherein the at least one base connecting member comprises a circular plate having a plurality of airflow openings therethrough, respective ones of the plurality of airflow openings being aligned with respective ones of the plurality of dome cooling passages.

11. The dome-deflector assembly according to claim 9, wherein the at least one base connecting member comprises a plurality of spoke-type connectors.

12. The dome-deflector assembly according to claim 9, wherein the at least one top connecting member comprises a circular plate having a plurality of airflow openings therethrough, respective ones of the plurality of airflow openings being aligned with respective ones of the plurality of deflector cooling passages.

13. The dome-deflector assembly according to claim 9, wherein the at least one top connecting member comprises a plurality of spoke-type connectors.

14. The dome-deflector assembly according to claim 1, wherein the plurality of deflector cooling passages are arranged in a plurality of circumferential rows about the respective ones of the plurality of deflector-side connecting member openings.

15. The dome-deflector assembly according to claim 14, wherein the plurality of circumferential rows includes a first circumferential row having a first group of deflector cooling passages and a second circumferential row having a second group of deflector cooling passages, the first circumferential row being arranged a first radial distance from a center of the respective ones of the plurality of deflector-side connecting member openings, and the second circumferential row being arranged a second radial distance greater than the first radial distance from the center of the respective ones of the plurality of deflector-side connecting member openings.

16. The dome-deflector assembly according to claim 15, wherein respective ones of the deflector cooling passages in the first group and respective ones of the deflector cooling passages in the second group are radially aligned with each other along a radial line extending from the center of the respective ones of the plurality of deflector-side connecting member openings.

17. The dome-deflector assembly according to claim 15, wherein respective ones of the deflector cooling passages in the first group and respective ones of the deflector cooling passages in the second group are circumferentially offset from each other with respect to a radial line extending from the center of the respective ones of the plurality of deflector-side connecting member openings.

18. The dome-deflector assembly according to claim 15, wherein the deflector cooling passages in the first group and the deflector cooling passages in the second group are each arranged at an angle so to direct the flow of cooling air from the sleeve cavity toward a centerline axis of the respective ones of the plurality of deflector-side connecting member openings.

* * * * *